US010171321B2

(12) United States Patent
Prieto et al.

(10) Patent No.: US 10,171,321 B2
(45) Date of Patent: Jan. 1, 2019

(54) ADAPTIVE PUSH-BASED MONITORING OF NETWORKED ENTITIES

(71) Applicant: Cisco Technology, Inc., San Jose, CA (US)

(72) Inventors: Alberto Gonzalez Prieto, Mountain View, CA (US); Alexander L. Clemm, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 14/666,804

(22) Filed: Mar. 24, 2015

(65) Prior Publication Data

US 2016/0283544 A1 Sep. 29, 2016

(51) Int. Cl.
*H04L 12/26* (2006.01)
*G06F 17/30* (2006.01)

(52) U.S. Cl.
CPC ............ *H04L 43/08* (2013.01); *H04L 43/065* (2013.01); *H04L 43/0817* (2013.01); *H04L 43/106* (2013.01); *G06F 17/30943* (2013.01)

(58) Field of Classification Search
None
See application file for complete search history.

(56) References Cited

U.S. PATENT DOCUMENTS

| 5,049,873 A * | 9/1991 | Robins ................... H04L 45/02 340/2.1 |
| 2003/0135382 A1* | 7/2003 | Marejka .............. G06F 11/0709 709/232 |
| 2004/0221032 A1* | 11/2004 | Bernstein ............ H04L 41/0896 709/224 |
| 2005/0114708 A1* | 5/2005 | DeStefano .......... H04L 63/1425 726/4 |
| 2010/0082840 A1* | 4/2010 | Beeston .................. H04L 45/00 709/238 |

(Continued)

OTHER PUBLICATIONS

Dordal. "An Introduction to Computer Networks, edition 1.9.0". archive.org capture dated Feb. 8, 2015. Chapter 18: Queuing and Scheduling. Retrieved Mar. 2017.*

(Continued)

*Primary Examiner* — Charles D Adams
*Assistant Examiner* — Irene Baker
(74) *Attorney, Agent, or Firm* — Hickman Palermo Becker Bingham LLP

(57) ABSTRACT

Systems and methods for managing state data from monitored entities in a computing environment are described. In a push-based approach, a publisher computer obtains state data of an element from the monitored entities and sends the state data on to a subscriber computer. From the state data, the publisher computer generates one metadata record for the element that is updated as newer state data is obtained such that each element is associated with just one record. The publisher computer scores and ranks the records of the elements based on a time since previous state data was sent to the subscriber computer, a magnitude of a change, and the existence of one or more event flags. The publisher computer schedules and queues the state data according to their ranking. The highest priority record in a queue is sent only when a timing signal indicates that state data can be sent.

19 Claims, 5 Drawing Sheets

(56) References Cited

U.S. PATENT DOCUMENTS

| | | | | |
|---|---|---|---|---|
| 2010/0179996 | A1* | 7/2010 | Jones | G06Q 10/107 |
| | | | | 709/206 |
| 2012/0017002 | A1* | 1/2012 | Andreasson | H04L 43/0811 |
| | | | | 709/231 |
| 2013/0111015 | A1* | 5/2013 | Bauchot | H04L 43/08 |
| | | | | 709/224 |
| 2014/0172842 | A1* | 6/2014 | Sumanth | H04L 43/08 |
| | | | | 707/723 |
| 2014/0280886 | A1* | 9/2014 | Burns | H04L 43/04 |
| | | | | 709/224 |
| 2015/0049631 | A1* | 2/2015 | Heron | H04L 45/02 |
| | | | | 370/254 |

OTHER PUBLICATIONS

Henderson et al. "Product form in networks of queues with batch arrivals and batch services." Dec. 1990. Springer, Queuing Systems, vol. 6, Issue 1, pp. 71-87. Retrieved Mar. 2017.*

Johnson. "Using Weights in the Analysis of Survey Data". Nov. 2008. Pennsylvania State University, Dept. of Sociology, Population Research Institute. Accessed Mar. 2018.*

Techopedia. "Packet Buffer". Dec. 4, 2012 snapshot via Archive. org. URL Link: https://www.techopedia.com/definition/2796/packet-buffer. Accessed Oct. 2018. (Year: 2012).*

Batra et al. "Packet Buffer Management for a High-Speed Network Interface Card". 2007 16th International Conference on Computer Communications and Networks. DOI: 10.1109/ICCCN.2007. 4317818. URL Link: https://ieeexplore.ieee.org/document/4317818. Accessed Oct. 2018. (Year: 2007).*

* cited by examiner

ADAPTIVE PUSH-BASED MONITORING OF NETWORKED ENTITIES

TECHNICAL FIELD

The present disclosure generally relates to network management and, more particularly, to monitoring entities in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In networked environments, it is important to have information detailing a state of various entities in the networked environment. Monitoring entities, including monitoring applications, obtain updates from the entities being monitored according to one of two approaches: pull-based or push-based. In pull-based approaches, the monitoring application explicitly polls the monitored entity every time it desires more data (i.e., an update of the state). The monitored entity is reactive. If the monitoring entity stops polling, the monitored entity will not send any more data.

Push-based approaches follow a publisher/subscriber paradigm where each monitored entity is a publisher and the monitoring entity is the subscriber. The subscriber specifies what data it is interested in and how it wants to receive it (i.e., subscribes). The publisher will send data (i.e., updates) to the subscriber after that specification (i.e., publishes).

In pull-based approaches using polling, the monitoring entity has complete control on resource usage but may issue redundant requests for the same data in every poll. Polling solutions offer challenges with regards to resilience and synchronization of data which requires timing that is precisely synchronized across multiple devices (to ensure data is retrieved at the same instance in time to make it comparable, and to avoid issues with regard to jitter and delay variations of requests which might cause data to be aggregated over intervals that are not evenly spaced). Note that when the state of the monitored entity does not change, multiple polls result in no additional information for the monitoring entity.

Push-based approaches can be more efficient in terms of resource usage since each message exchange provides the monitoring entity with additional information. Further, no separate message is sent to initiate each message exchange. Push-based approaches can be more timely, as changes can be pushed when they occur without needing to wait for the next polling interval. Synchronization is greatly facilitated and robustness is improved as missing or delayed polling requests are a non-issue. All these properties make pushing a highly desirable approach. Note that push-based approaches move intelligence (and therefore complexity) to the monitored entities.

In "on-change" or periodic push-based approaches, subscribers are notified when the state of the monitored entity changes (or it changes significantly). A challenge of such approaches is that under certain scenarios, a high rate of updates can result which in the worst case can overwhelm a subscriber and lead do problems such as indiscriminate dropping of data. For example, a subscription can concern a "subtree", and a subscriber may not always know the number of data items in the subtree, hence the volume of data to expect from updates. Likewise, subscriptions can involve filters, and subscribers may not be able to predict in advance how many nodes or data items meet the filter criteria.

DETAILED DESCRIPTION

Figure 1:
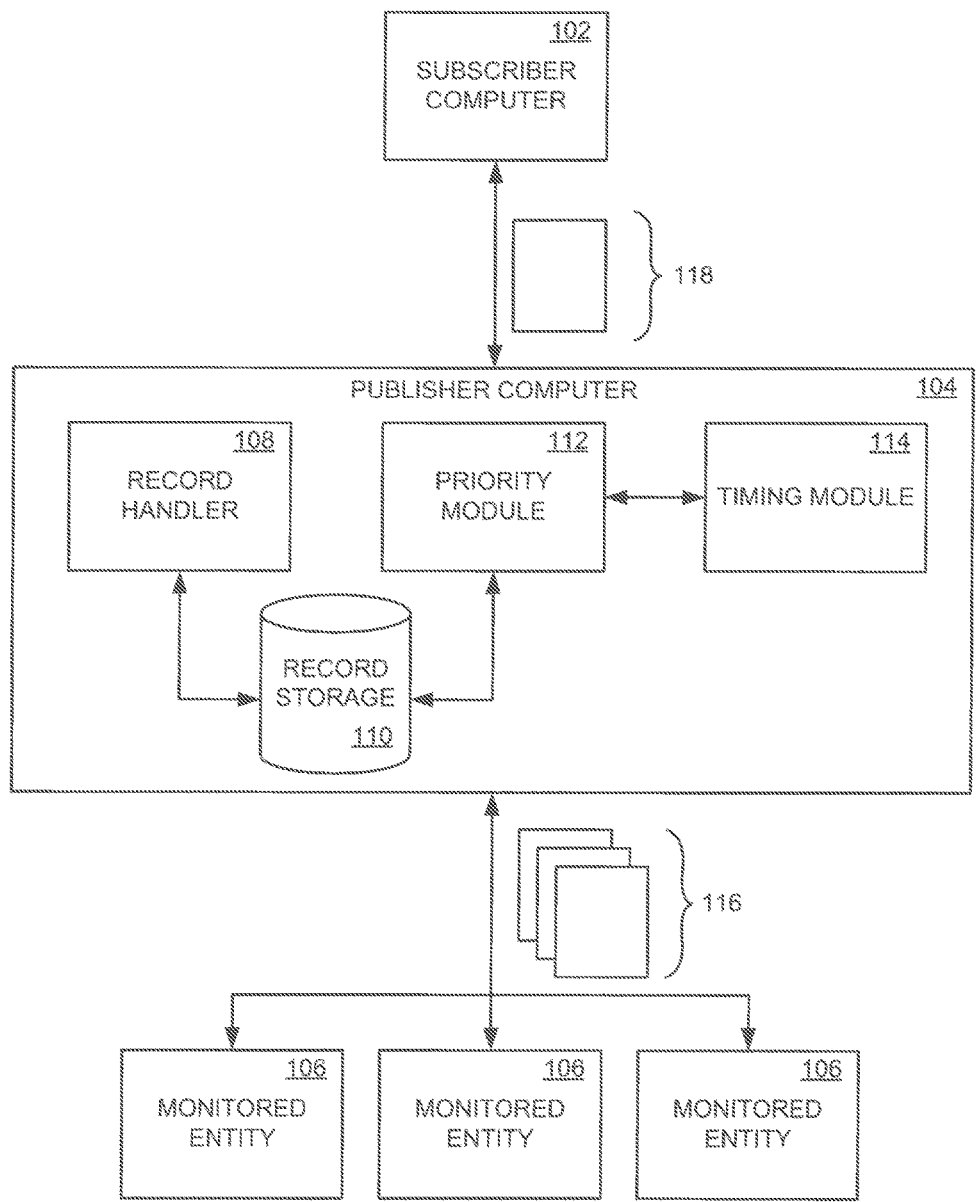
FIG. 1 depicts an example system for monitoring entities in a networked environment.

New techniques for providing updates from monitored entities to monitoring entities in a networked environment are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 System Overview
3.0 Update Delivery
4.0 Record Management
5.0 Example Implementation of Priority Queue
6.0 Implementation Mechanisms—Hardware Overview
7.0 Extensions and Alternatives 1.0 Overview Monitoring entities using a push-based approach to monitor network resources can be overwhelmed by unnecessary or unimportant updates. "Entities," in this context, typically comprise elements of networking infrastructure such as routers or switches, or endpoint devices such as printers, scanners, multifunction printers, and the like. Likewise, when a push-based approach is used and a large number of unnecessary or unimportant updates occur, updates may be indiscriminately dropped, which may cause important updates to be lost.

To avoid resulting problems (e.g., dropped updates, high latency), an ability to throttle and rate-control the updates is desirable. However, doing so indiscriminately can cause further issues. For example, if frequency of updates is blindly restricted, data can go stale. In these instances, the monitoring entities do not have access to accurate, timely data. To address these drawbacks, prioritization and rate-control mechanisms may control update rates in a push-based approach while at the same time ensuring that higher-priority updates will be delivered.

In various embodiments, an adaptive prioritization and rate-control mechanism for "on-change" push solutions maximizes the coherence between an actual state of the monitored entity and the reported state pushed to monitoring entity, while capping the rate at which updates are sent to the monitoring entity.

In some instances, for each update generated by a monitored entity or data producer, a publisher computer is configured to generate or update a record of the monitored element of the entity based on one or more updates (also referred to as state data) received from the monitored entity. If a subscription has an "on-change" policy, whenever the monitored entity "changes" (e.g. its value is updated, or a new data item is created or deleted), the monitored entity creates an update to send out as part of the subscription. In response to receiving the updates, the publisher computer can queue updates it received. If there is already a queue of updates not sent to the subscriber computer, then the publisher computer prioritizes the received updates and inserts them into the queue according to their relative priority. A relative priority of each update is calculated from a variety of factors—the time that was emitted since the last time an update was sent for the same data item, as well as the type of update being sent (for example, a value change, or an indication that the item been created or deleted). In the case of a value change, the relative "magnitude" of the change is used to determine a priority of the update. For example, different data types are treated differently. To illustrate, the value change can be subject to additional differentiated treatment depending on the data type (for example a Boolean is different from an integer—and the "magnitude" of the change is a factor in case of the integer—but the Boolean may be more relevant than the integer.) For each of the records, to determine priority of an update, an incoherency metric is calculated. The incoherency metric is indicative of a difference between an actual state of the monitored entity and the previously reported state of the monitored entity. Using the respective incoherency metrics, the updates are prioritized and stored within a priority queue. A highest priority update is sent to the monitoring entity according to a timing signal.

2.0 System Overview

FIG. 1 depicts an example system for monitoring entities in a networked environment. The networked environment comprises a publisher computer 104 which is logically positioned between a plurality of monitored entities 106 and a subscriber computer 102. Although the publisher computer 104 is depicted as a single computing device, the publisher computer 104 may comprise multiple computing devices. Similarly, although only three monitored entities 106 are depicted as being in electronic communication with the publisher computer 104, the network environment may include many more monitored entities 106. In some instances, the entities are not physically different machines than the publisher computer 104. The entities can be applications running on a switch and the logic in publisher computer 104 runs on that switch. That is, the publisher computer 104 and the monitored entities 106 can be processes in a single router or switch.

A monitored entity 106 may be a physical or logical entity in the device that is subject to monitoring or management, for example a set of interfaces, along with a set of parameters for each interface. In general, a monitored entity 106 can be represented as a data node or a subtree of data nodes in a YANG datastore. Accordingly, the example system of FIG. 1 can be used to send updates of YANG data nodes, for example.

A monitored entity 106 may be any type of networked device, including, but not limited to, routers, switches, firewalls, printers, scanners, computing devices (including servers), and telephones. The subscriber computer 102 comprises a computing device that is specifically configured to receive and process state data of the monitored entities 106.

In some instances, the subscriber computer 102 can be a networking device with compute capabilities, a controller, or other computing machine.

The publisher computer 104 comprises a record handler 108, a record storage memory 110, a priority module 112, and a timing module 114. Record handler 108, priority module 112, and timing module 114 each may comprise one or more computer programs, other software elements, digital logic such as ASICs or FPGAs, or other functional elements hosted or executed by a general-purpose computer or configured as part of a special-purpose computer.

The publisher computer 104, at a high level, is programmed or configured with a "cap" on the rate with which it is permitted to send updates to the subscriber computer 102 and deliver updates no faster than the capped rate. To do so, the publisher computer 104 receives electronic digital state data of an element (also referred to as an "update") of the monitored entity from the monitored entities 106 and is programmed or configured to generate or update a record of the element, determine an incoherence metric for each of the records, prioritize the updates according to the incoherence metric, and send a highest priority update to the subscriber computer 102. The sending of highest priority update, and the population of new updates into the queue appear asynchronously. The publisher computer 104 may not send an update each time a new update appears, but in some cases the publisher computer 104 may receive more updates than it can send to the subscriber computer 102, in which case the updates are queued at the publisher computer 104.

In one embodiment, the record handler 108 receives electronic digital state data 116 from the respective monitored entities 106. The electronic digital state data comprises an element identifier of an element of the monitored entity 106, a current value of the element, and a time stamp of the time at which the state data was generated. In the YANG datastore context, elements are data nodes comprising data items with their associated value. An example may be a data node that represents an interface, which may in turn contain other data nodes for various interface statistics, for example one data node for a packet drop counter associated with the interface, another data node for a counter for transmitted packets, another data node indicating the type of interface, etc.

The state data 116 may further include one or more flags indicating an occurrence of an event with respect to the data element. An event is something that happens that may be of interest, for example, a configuration change, a fault, a change in status, crossing a threshold, or an external input to the monitored entity 106. In embodiments comprising "on-change" subscriptions, the subscriber computer 102 receives an update when a change occurs. In embodiments comprising "periodic" subscriptions, the subscriber computer 102 receives an update regardless of whether or not there was a change in the monitored entity 106. To assess the priority of the respective updates, data items with values that are indicative of an "outlier" or an "anomaly" are prioritized by the publisher computer 104 over updates that are "normal".

The record handler 108 is configured or programmed, upon receiving the state data 116, to generate a metadata record or to update an existing record based on the state data, as described herein. The record comprises the element identifier, the current value of the element, a time elapsed since a previous update of the element has been sent to the subscriber computer 102, the value of the element at the time the previous update was sent, and one or more flags indicating an occurrence of an event (for example, creation or deletion of a monitored element). The time elapsed can be maintained with the record, or it could simply be maintained with an auxiliary data structure. The time elapsed is metadata about the data nodes that are being monitored or that are subscribed to. This meta-data is not sent to the subscriber computer 102, it is merely used to compute the priority. The occurrence of an event refers to the type of update (for example, a value change, creation of a new data item or data node, or deletion of a data item or data node).

The priority module 112 is configured or programmed to obtain the record and determines a priority of the update by calculating a coherency metric based on the update and the record corresponding to the element from which the update was received. The priority module 112 is configured to determine the priority of an update from the factors mentioned earlier, then based on its priority, the update is either placed in the proper place in a queue in a buffer memory such as the record storage memory 110 (which is ordered according to prioritization) or it is determined which queue (for example, high/medium/low priority queues) the update should go to according to its priority. There is also a possibility for an update to be dropped, such as when the queue(s) are full and the priority of the update is too low.

The updates can be stored in one of a variety of data structures associated with priority queues including, but not limited to, a heap, an unsorted list, a linked list, or a binary search tree. To insert the record into a data structure according to priority, a binary search insertion, an insertion sort, or a binary insertion sort can be performed. In some embodiments, more than one queue can be generated where each of the queues is assigned a priority relative to the other queues (for example, high, medium, and low priority queues). In the case of multiple queues, one update might be removed from a queue and not be sent to the subscriber computer 102. For example, if an update is in the medium priority queue, and then another update of the same element is received that is determined to be of high priority and placed in the high-priority queue, the earlier update is removed from the medium priority queue without having been sent.

The timing module 114 is programmed to receive a target rate from the subscriber computer 102. The target rate may be a capped maximum frequency at which the subscriber computer 102 is to receive the update records from the publisher computer 104. The target rate can be received prior to records being sent to the subscriber computer 102 or updated by the subscriber computer 102 during operation. The timing module 114 can, in some embodiments, be programmed to receive a burst rate from the subscriber computer 102. The burst rate can be a higher rate than a target rate. The burst rate is associated with a burst duration indicating a time period or length of time during which the publisher computer 104 is to send records at the burst rate. In some embodiments, a token bucket burst is used, which is the maximum number of back-to-back updates that can be sent (under some circumstances). In these embodiments, the token bucket is used to govern a burst size rather than the burst rate.

The timing module 114 is programmed, upon receiving the target rate, generates a timing signal that is used to ensure that the capped maximum frequency of updates being sent to the subscriber computer 102 is not exceeded. In some embodiments, the timing module comprises a token bucket. In a token bucket, token are generated at the target rate. When a token is made available, a highest priority state data 118 (as determined by the priority module 112) obtains the token and is sent to the subscriber computer 102.

3.0 Update Delivery

Figure 2:
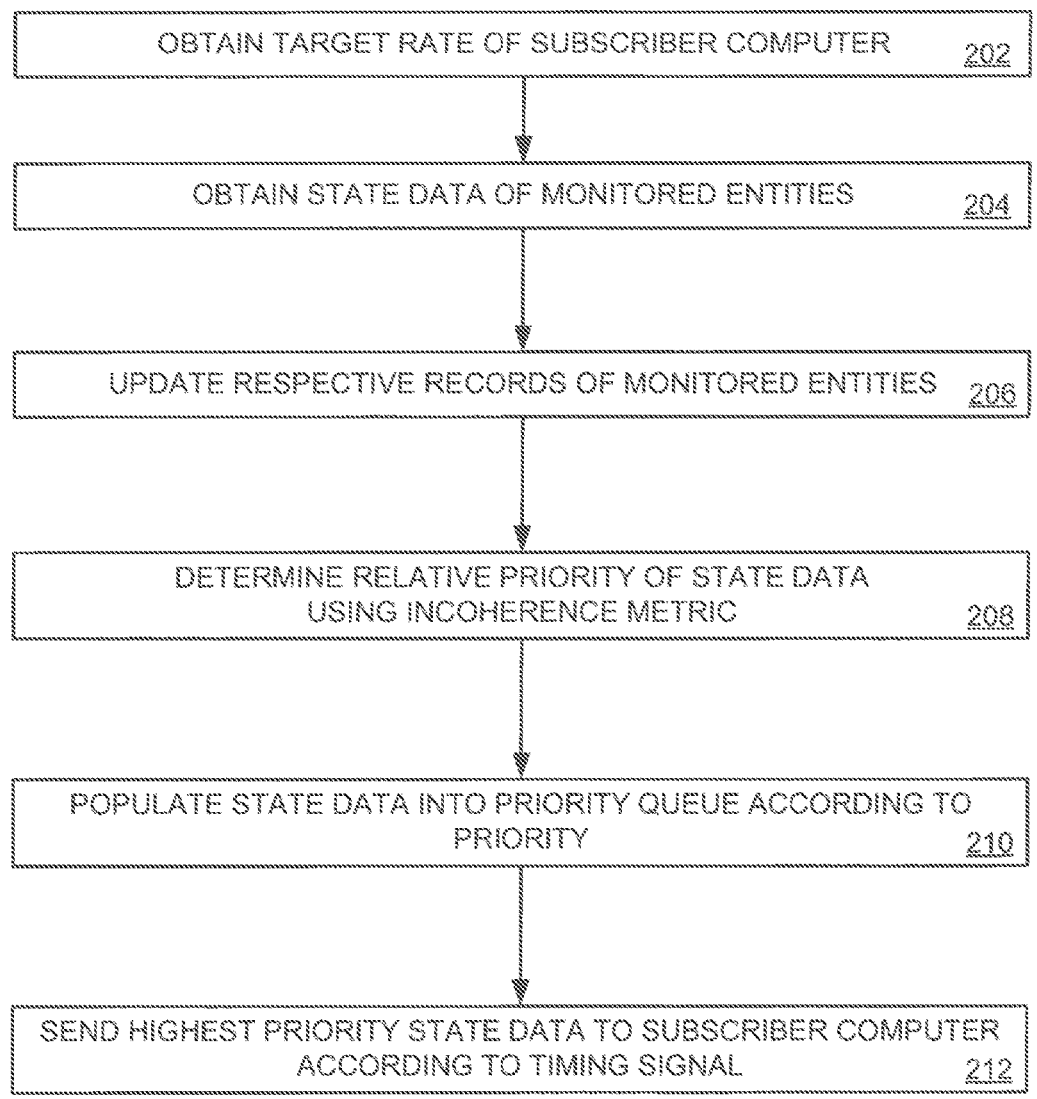
FIG. 2 illustrates a process for providing updates to a subscribing computer, according to some embodiments.

FIG. 2 illustrates a process for providing updates to a subscribing computer 102, according to one embodiment. FIG. 2 may represent an algorithm or pseudocode for programming or configuring the timing module 114, record handler 108 and other elements to operate automatically according to the description of functions in this section.

Rather than indiscriminately attempting to send updates for every state change when resources to process those updates are constrained, which may cause a variety of issues such as overwhelming of receivers and indiscriminate dropping of updates, the process described herein sends the most relevant updates, as determined by a mechanism that takes into account the relevance of the change as reflected in an incoherency metric. The incoherency metric can be used to prioritize updates to send when only a limited amount of push bandwidth is available, or only a limited push volume can be processed by the subscriber computer 102.

The incoherence metric, takes into account the size and significance of the change. Larger changes in state, or changes that are "out of the ordinary" are considered more relevant and require more immediate attention than small changes that are within a normal "to-be-expected" range, and so the incoherency metric will be greater in these cases. The incoherency metric accounts for elapsed time since the last time an update for the particular element was sent to the subscriber computer 102, for the type of change (update vs create vs delete), the type of the data item, and its data type (e.g. Boolean vs integer). Delayed updates have increasing priority to avoid inacceptable staleness of data.

The rate of push updates is controlled by the timing module 114 to a level specified by the subscriber computer 102. In an embodiment, an adaptive throttling mechanism can be used to, for example, "smooth out" sending the updates to a configurable and sustainable rate while ensuring that high priority updates are sent before lower priority updates, and to reduce the volume of updates by delaying lower priority updates by sending only the most recent/current update to avoid transmission of multiple updates containing redundant state data.

In an operation 202, the timing module 114 in publisher computer 104 obtains the target rate of the subscriber computer 102 from the subscriber computer 102. The target rate is the rate at which the subscriber computer 102 can receive records 118. In some instances, a burst size, and associated time duration of the burst size, is obtained.

In an operation 204, the record handler 108 of the publisher computer 104 obtains state data of monitored entities 106. Each piece of state data 116 comprises an element identifier of an element of the monitored entity 106, a current value of the element, and a time stamp of the time at which the state data was generated.

In an operation 206, for each piece of state data 116, the record handler 108 updates a respective record of metadata of the element stored in the record storage memory 110. The record for each element whose current state has not been notified to the subscriber computer 102 includes: the element identifier, the current value (v) of the element, the time elapsed since a record of the element has been sent to the subscriber computer 102 (dt), the element value at that time (v_u), and one or more flags indicating events that have occurred. Two example flag values indicate creation events and removal events: a "Cr" flag indicates the element exists while the last update indicated it was removed, and an "Rm" flag indicates the element does not exist while the last update indicated it existed. The operations performed as part of the operation 206 are described in connection with FIG. 3.

In an operation 208, the priority module 112 determines a relative priority of the records in the record storage memory 110. The relative priority of the records is determined by calculating an incoherence metric of the record using data included in the record. The incoherence metric can be computed using different formulae that share a set of common factors and their qualitative impact on the metric. One example of such a formula is:

$$\text{Incoherence} = \text{abs}(w\_e*(v\_u-v))*(dt+1)*\text{event\_weight}$$

where abs is the absolute value function, w_e is a configurable weight, denoting the relevance of the element changes in value; v_u is the value of the element at the time the previous record of the element was sent; v is the most recent value of the element; dt is the amount of time that has elapsed since the previous record was sent, and event_weight={1 for "no event", w_c for creations, w_r for removals} where w_c is a configurable weight, denoting the relevance of element creations and w_r is configurable weight, denoting the relevance of element removals. In some instances, the term "(v_u−v)" can be replaced by the term "(v_u−v)/v" to denote the relative change of the value.

In some instances, the term "(v_u−v)" can be zero. For example, in periodic updates, the data item simply may not have changed. In on-change updates, the data item may have originally changed (v_u−v !=0). However, while queued for sending, its value may undergo another change, back to the original value. In this case, the values are identical. However, an update should still be sent, because there was an intermediate update during which the value changed—that in the meantime the value went back to its original value is coincidental.

The configurable weights are set by the priority module 112 and can vary from element to element or be the same for each element. In some instances, the configurable weights are set based on a history of changes in value. The configurable weights for the same element may be selected from a set of configurable weights using, for example, a set of one or more thresholds such that when a change in value crosses a particular threshold, the weight w_e changes so that the change is value is weighted more lightly or more heavily. The weights may be set manually, by an administrator. In some embodiments, an application or algorithm that determines configuration values based on statistical baselines from past observations can be used.

In an operation 210, when the incoherence metric is calculated for a record, the priority module 112 populates the state data (or a pointer to the stored state data) into a priority queue. In some embodiments, a greater incoherence metric indicates that the state data has a higher priority. Thus, the state data associated with the greatest incoherence metric has the highest priority in the priority queue. The priority queue can be implemented in a variety of ways, as described in connection with the priority module 112. The priority queue allows for state data to be moved up or down in priority as time elapses or as additional state data of the element is received and the record is updated by the record handler 108.

In an operation 212, the priority module 112 sends a highest priority state data 118 to the subscriber computer 102 by according to the timing signal generated by the timing module 114, as described above.

4.0 Record Management

Figure 3:
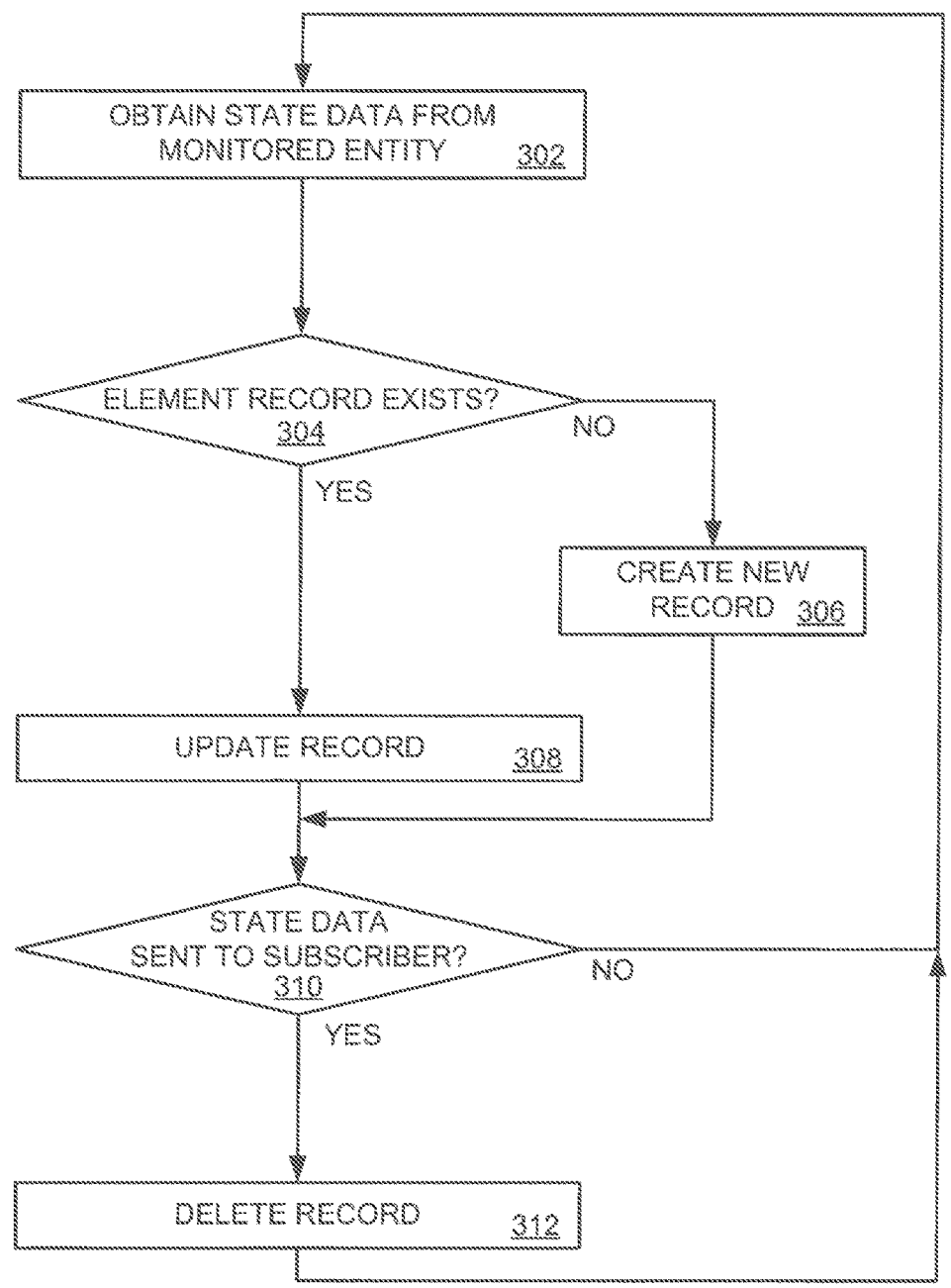
FIG. 3 illustrates a process for updating records not yet sent to the subscribing computer, according to some embodiments.

FIG. 3 illustrates a process for updating records of metadata about state data not yet sent to the subscribing computer, according to some embodiments. FIG. 3 may represent an algorithm or pseudocode for programming or configuring the record handler 108 to operate automatically according to the description of functions in this section.

In some embodiments as depicted in FIG. 3, the respective state data 116 of an element is not sent to the subscriber computer 102. The unsent state data are not stored as multiple non-notified updates and do not create multiple "update records". In these embodiments, there can be at most one metadata record per element. In other embodiments, the record handler 108 can store multiple metadata records per data element when the subscriber computer 102 has provided instructions to that effect. The subscriber computer 102 might do so when determining how a current state of the element or monitored entity has evolved over time.

In an operation 302, the record handler 108 obtains state data 116 from a monitored entity 106 as described herein.

In an operation 304, the record handler 108 determines whether a record for the element identified in the state data already exists in the record storage memory 110. The element identifier included in the state table is compared to element identifiers included in existing records in the record storage memory 110. The comparison can be performed by searching the record storage memory 110 for the element identifier.

If the element identifier is not associated with an existing record, the record handler 108 creates a new record in an operation 306. The new record is created by storing, from the state data 116, the data in the state data 116 as a record in the record storage memory 110. The process then proceeds to an operation 310.

In some embodiments, the record handler 108 maintains a log indicating, for each element, a timestamp indicating when state data 116 for the element was previously sent to the subscriber computer 102 and a value of the element at that time. The data stored in the log is not assigned a priority. The newly created record can include the logged timestamp and value as well as the timestamp and value of the state data obtained in the operation 302 so as to indicate a time since state data 116 of the element was reported to the subscriber computer 102 and a corresponding change in value of the element. Thus, in the incoherence metric of the operation 208, the dt value and the difference, (v_u−v), is non-zero at the time the record is created.

If the element corresponds to an existing record, the record handler 108 retrieves and updates the existing record. The record is updated by deleting the most recent stored value of the element and storing, in its place in the record, the value included in the state data. The stored timestamp is replaced by the timestamp of the obtained state data. In embodiments where a more detailed record is desired, the value of the element and corresponding timestamp in the state data can be appended to a list within the record. If one or more flags are set in the state data, the corresponding flags are set in the record.

In an operation 310, the record handler 108 determines whether state data 116 has been sent to the subscriber computer 102 by the priority module 112 as described in connection with FIG. 2. If the state data 116 has not been sent, the process returns to the operation 302.

If the state data 116 has been sent, the corresponding record is deleted in the operation 312 before the process returns to the operation 302 (where, upon receiving the state data, the operation 306 is performed to re-create the record). Therefore, the process ensures that only the most current state of an element can be sent. In some embodiments, the time of the state data in the record or time when the record was sent to the subscriber computer and the then-current value of the state data is logged.

5.0 Example Implementation of Priority Queue

Figure 4:
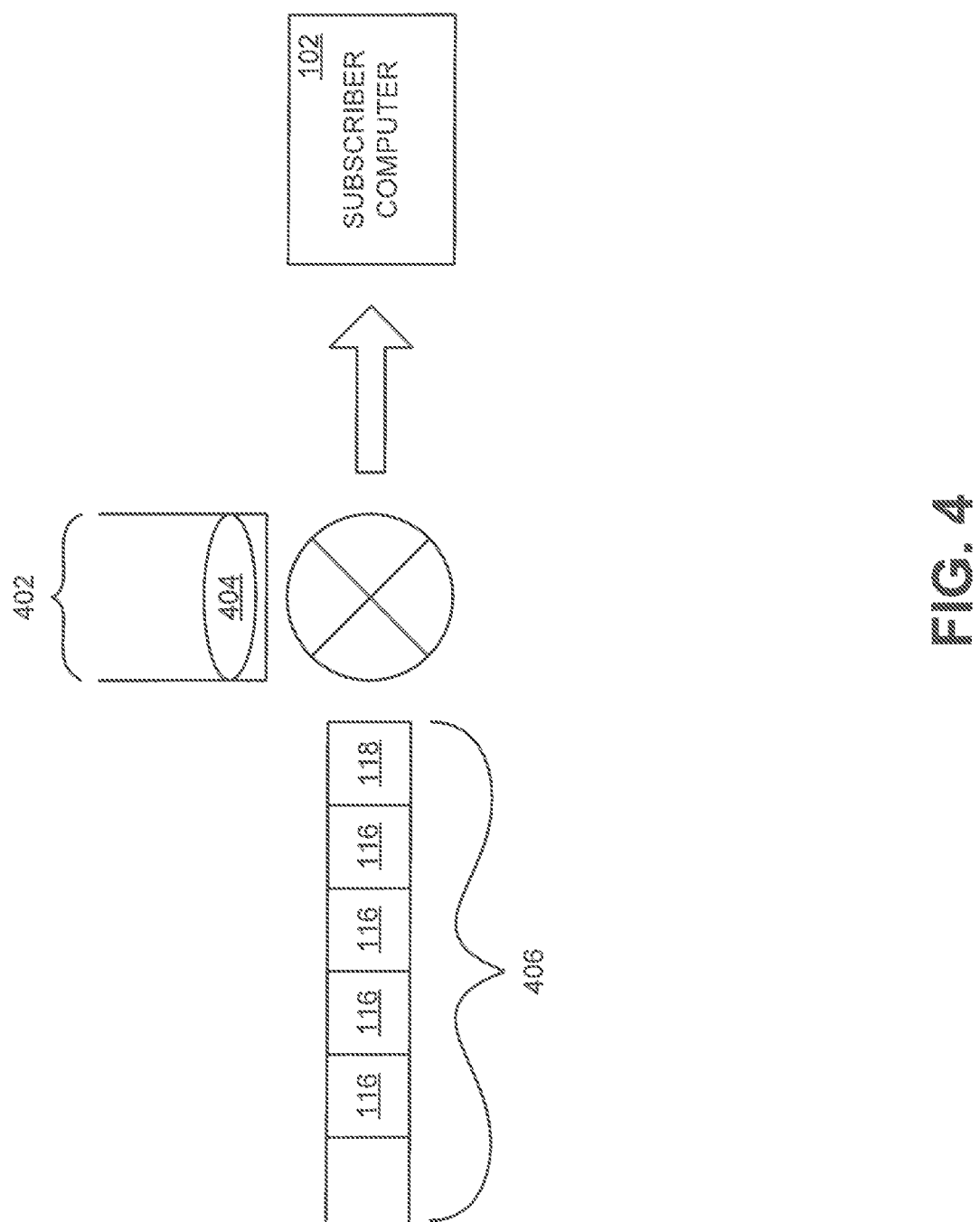
FIG. 4 illustrates a priority queue and token bucket, according to some embodiments.

FIG. 4 illustrates a priority queue and a token bucket, according to some embodiments. The priority queue is used to identify the highest priority state data 116 and the token bucket is one example implementation for generating the timing signal.

The token bucket 402 is filled with a plurality of tokens 404 according to the target rate set by the subscriber computer 102. To achieve a burst rate, the token bucket 402 is made "deeper" so that it is able to hold additional tokens 404 for the period of the burst.

When a token 404 is available in the token bucket 402, a state data 118 having a highest priority in a priority queue 406 obtains the token. The priority queue 406 can be sorted according to incoherence metric of the respective records. Ranking within the queue can be dynamic as new state data (for example, a creation or removal flag) can significantly affect the priority of a particular record. With the token, the state data 118 or a portion thereof is sent to the subscriber computer 102. The priority queue 406 can be implemented as a heap and a binary search can be performed to identify the state data 118 having the highest priority. The corresponding record is deleted after being sent to the subscriber computer 102.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
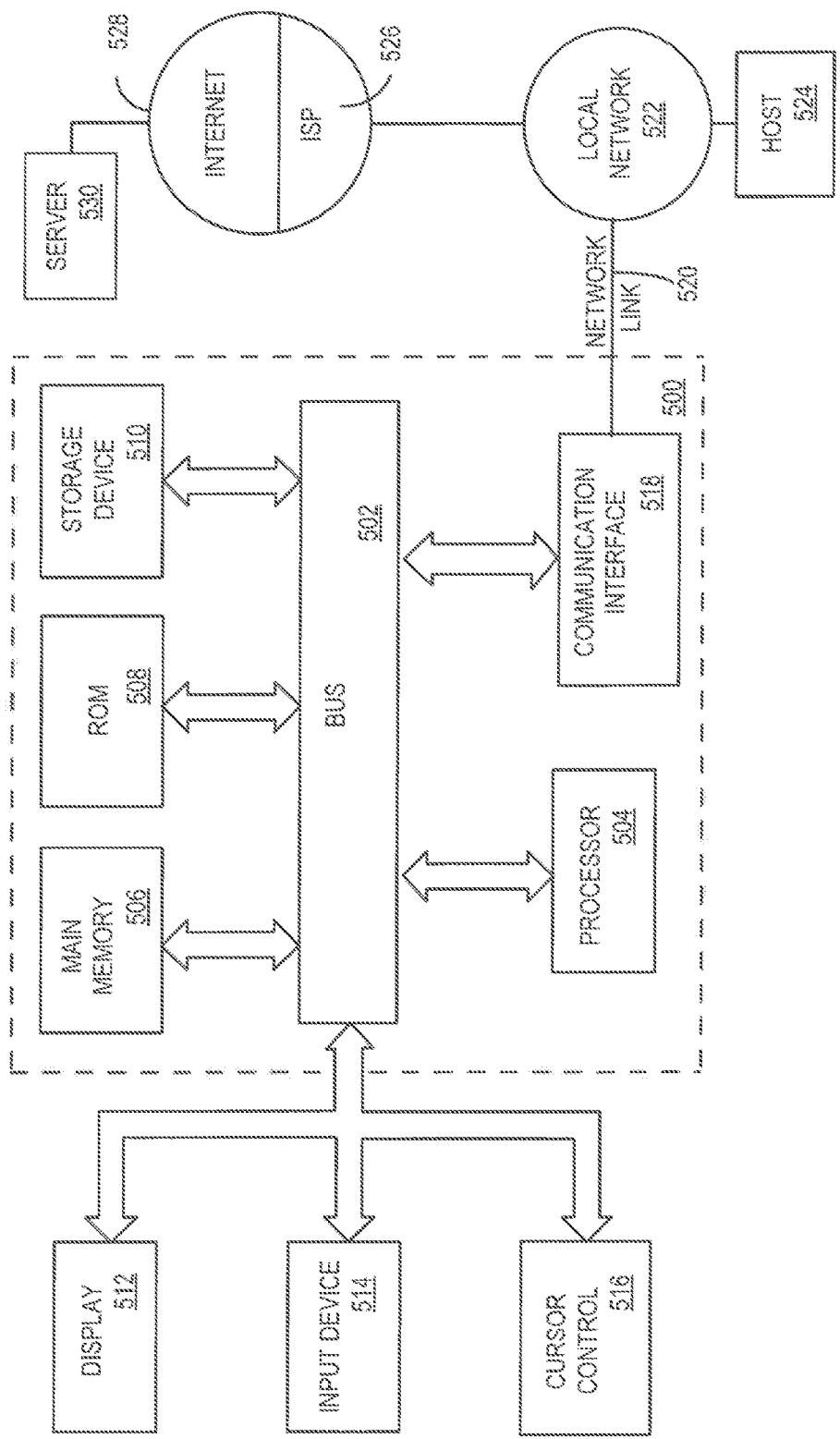
FIG. 5 illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 430 might transmit a requested code for an application program through Internet 528, ISP 526, local network 522 and communication interface 518.

The received code may be executed by processor 504 as it is received, and/or stored in storage device 510, or other non-volatile storage for later execution.

7.0 Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A publisher computer system for restricting indiscriminate dropping of state data comprising:
   one or more processors;
   a non-transitory computer-readable storage medium storing which when executed by the one or more processors, cause the one or more processors to perform:
   using the one or more processors, obtaining electronic digital state data for one or more routers or switches in a monitored network environment, wherein the state data for a particular router or switch comprises a timestamp value, an element identifier of an element of that particular router or switch that is monitored, and a current value of the element;
   using the one or more processors, updating a record of the element wherein the record is stored in a buffer memory to create an updated record, the updated record of the element comprising the element identifier, the current value of the element, an elapsed time since a previous update of the element has been sent to a subscriber computer, and a previous value of the element;
   using the one or more processors, determining a priority value for the state data by calculating an incoherence metric of the element based on a product of the elapsed time, an event weight, and a weighted absolute value of a difference between the previous value of the element and the current value of the element, wherein the event weight is a configurable weight value corresponding to a change in the existence of an element between the time when the previous value was sent and the current value of the element;
   using the one or more processors, copying the state data into a priority queue that is maintained in the buffer memory according to the priority value of the element relative to the priority values of a plurality of other elements;
   using the one or more processors, controlling a frequency of updates by electronically communicating first state data having a highest priority value in the priority queue to the subscriber computer only when a timing signal from a timing module indicates that the first state data is to be sent.

2. The publisher computer system of claim 1, further comprising instructions which when executed cause determining the priority value of the state based on a flag in the state data.

3. The publisher computer system of claim 2, wherein the flag is a creation flag indicating that the element was created in the elapsed time.

4. The publisher computer system of claim 2, wherein the flag is a removal flag indicating that the element was removed in the elapsed time.

5. The publisher computer system of claim 2, further comprising instructions which when executed cause determining the incoherence metric of the element based on whether the flag is in the record.

6. The publisher computer system of claim 1, further comprising instructions which when executed cause, upon sending the first state data, deleting the first record in the buffer memory.

7. The publisher computer system of claim 6, further comprising instructions which when executed cause generating the record of the element of the first record in response to receiving a subsequent state value for the element.

8. The publisher computer system of claim 1, further comprising instructions which when executed cause updating the record of the element by appending the current value in a list of values in the record.

9. The publisher computer system of claim 1, further comprising instructions which when executed cause re-ordering the priority queue based on state data of the element that is obtained after performing the steps of claim 1.

10. The publisher computer system of claim 1, wherein the priority queue comprises an array of priority sub-queues, each of the sub-queues having a different queue priority value.

11. The publisher computer system of claim 1, wherein the timing module is configured to generate the timing signal repeatedly according to a frequency.

12. The publisher computer system of claim 1, wherein the timing module is coupled to a token bucket that is populated with tokens at a frequency.

13. The publisher computer system of claim 1, wherein the timing module is configured to generate the timing signal repeatedly according to a frequency, and is configured to operate in a burst mode that exceeds the frequency for a limited time.

14. The publisher computer system of claim 1, wherein the electronic digital state data comprises a plurality of data nodes in a Yet Another Next Generation (YANG) data store.

15. A publishing method to restrict indiscriminate dropping of state data comprising:
   obtaining electronic digital state data for one or more routers or switches in a monitored network environment, wherein the state data for a particular router or switch comprises a timestamp value, an element identifier of an element of that particular router or switch that is monitored, and a current value of the element;
   updating a record of the element wherein the record is stored in a buffer memory to create an updated record, the updated record of the element comprising the element identifier, the current value of the element, an elapsed time since a previous update of the element has been sent to a subscriber computer, and a previous value of the element;
   determining a priority value for the state data by calculating an incoherence metric of the element based on a product of the elapsed time, an event weight, and a weighted absolute value of a difference between the previous value of the element and the current value of the element, wherein the event weight is a configurable weight value corresponding to a change in the existence of an element between the time when the previous value was sent and the current value of the element;
   copying the state data into a priority queue that is maintained in the buffer memory according to the priority value of the element relative to the priority values of a plurality of other elements;
   controlling a frequency of updates by electronically communicating first state data having a highest priority value in the priority queue to a subscriber computer only when a timing signal indicates that the first state data is to be sent,
   wherein the method is performed by one or more computing devices.

16. The publishing method of claim 15, further comprising determining the priority value of the state data based on a flag in the state data.

17. The publishing method of claim 15, further comprising instructions which when executed cause re-ordering the priority queue based on state data of the element that is obtained after performing the steps of claim 15.

18. The publishing method of claim 15, further comprising generating the timing signal repeatedly according to a frequency.

19. The publishing method of claim 18, further comprising operating in a burst mode that exceeds the frequency for a limited time.

* * * * *